United States Patent
Vollmer

(10) Patent No.: US 10,199,888 B2
(45) Date of Patent: Feb. 5, 2019

(54) ROTOR OF A DYNAMOELECTRIC ROTARY MACHINE

(71) Applicant: Siemens Aktiengesellschaft, München (DE)

(72) Inventor: Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 860 days.

(21) Appl. No.: 14/461,045

(22) Filed: Aug. 15, 2014

(65) Prior Publication Data

US 2015/0048697 A1     Feb. 19, 2015

(30) Foreign Application Priority Data

Aug. 16, 2013  (EP) .................................. 13180733

(51) Int. Cl.
| | |
|---|---|
| *H02K 1/24* | (2006.01) |
| *H02K 1/12* | (2006.01) |
| *H02K 3/38* | (2006.01) |
| *H02K 11/04* | (2016.01) |
| *H02K 1/02* | (2006.01) |
| *H02K 1/27* | (2006.01) |

(52) U.S. Cl.
CPC ............... *H02K 1/246* (2013.01); *H02K 1/02* (2013.01); *H02K 1/12* (2013.01); *H02K 1/27* (2013.01); *H02K 1/2773* (2013.01); *H02K 3/38* (2013.01); *H02K 11/04* (2013.01)

(58) Field of Classification Search
CPC . H02K 1/12; H02K 11/04; H02K 3/38; H02K 1/02

USPC ............. 310/46, 43, 154.28, 156.43
See application file for complete search history.

(56) References Cited

U.S. PATENT DOCUMENTS

| | | |
|---|---|---|
| 6,483,221 B1 | 11/2002 | Pawellek et al. |
| 6,628,031 B2 | 9/2003 | Vollmer |
| 6,768,238 B2 | 7/2004 | Knauff et al. |
| 6,812,612 B2 | 11/2004 | Schunk et al. |
| 6,858,965 B2 | 2/2005 | Mueller et al. |
| 6,885,187 B2 | 4/2005 | Duenisch et al. |
| 6,943,467 B2 | 9/2005 | Potoradi et al. |
| 7,141,905 B2 | 11/2006 | Vollmer |
| 7,285,883 B2 | 10/2007 | Bott et al. |
| 7,564,158 B2 | 7/2009 | Huth et al. |
| 7,705,507 B2 | 4/2010 | Vollmer |
| 7,709,984 B2 | 5/2010 | Braun et al. |

(Continued)

FOREIGN PATENT DOCUMENTS

| | | |
|---|---|---|
| CN | 1388625 A | 1/2003 |
| CN | 1726629 A | 1/2006 |

(Continued)

*Primary Examiner* — Thomas Truong
*Assistant Examiner* — Leda Pham
(74) *Attorney, Agent, or Firm* — Henry M. Feiereisen LLC

(57) ABSTRACT

A reluctance rotor of a dynamoelectric rotary machine has an even number of poles constructed of a material having structural magnetic anisotropy. The magnetic anisotropy of the material is characterized by a first magnetic resistance, a magnetic permeability of $\mu r > 20$ and a saturation polarization of $>1T$ in a first spatial direction, and by a second magnetic resistance which is greater than the first magnetic resistance with a magnetic permeability of $\mu r < 1.6$ in spatial directions perpendicular to the first spatial direction.

6 Claims, 4 Drawing Sheets

(56) References Cited

U.S. PATENT DOCUMENTS

| | | |
|---|---|---|
| 7,732,967 B2 | 6/2010 | Schunk et al. |
| 7,755,315 B2 | 7/2010 | Bott et al. |
| 7,777,373 B2 | 8/2010 | Bott et al. |
| 7,859,160 B2 | 12/2010 | Vollmer |
| 7,884,522 B1 | 2/2011 | Petro et al. |
| 7,915,777 B2 | 3/2011 | Vollmer |
| 7,977,826 B2 | 7/2011 | Vollmer et al. |
| 8,026,640 B2 | 9/2011 | Bott et al. |
| 8,035,371 B2 | 10/2011 | Budde et al. |
| 8,063,517 B2 | 11/2011 | Bott et al. |
| 8,115,360 B2 | 2/2012 | Vollmer |
| 8,134,273 B2 | 3/2012 | Vollmer et al. |
| 8,227,951 B2 | 7/2012 | Grossmann et al. |
| 8,283,815 B2 | 10/2012 | Vollmer |
| 8,378,541 B2 | 2/2013 | Vollmer |
| 2003/0011267 A1 | 1/2003 | Vollmer |
| 2003/0094940 A1 | 5/2003 | Duenisch et al. |
| 2003/0173853 A1 | 9/2003 | Knauff et al. |
| 2004/0075359 A1 | 4/2004 | Mueller et al. |
| 2004/0084989 A1 | 5/2004 | Schunk et al. |
| 2004/0155539 A1 | 8/2004 | Potoradi et al. |
| 2004/0261553 A1 | 12/2004 | Bott et al. |
| 2005/0231060 A1 | 10/2005 | Vollmer |
| 2006/0219880 A1 | 10/2006 | Braun et al. |
| 2007/0035193 A1 | 2/2007 | Huth et al. |
| 2007/0040466 A1 | 2/2007 | Vollmer |
| 2007/0114861 A1 | 5/2007 | Bott et al. |
| 2007/0257566 A1 | 11/2007 | Vollmer |
| 2007/0257575 A1 | 11/2007 | Vollmer |
| 2008/0073985 A1 | 3/2008 | Bott et al. |
| 2008/0164777 A1 | 7/2008 | Braun et al. |
| 2008/0169718 A1 | 7/2008 | Bott et al. |
| 2008/0185931 A1 | 8/2008 | Platen et al. |
| 2008/0197741 A1 | 8/2008 | Schunk et al. |
| 2008/0197742 A1 | 8/2008 | Vollmer |
| 2008/0289440 A1 | 11/2008 | Denk et al. |
| 2008/0315704 A1 | 12/2008 | Vollmer |
| 2009/0009114 A1 | 1/2009 | Schunk et al. |
| 2009/0015080 A1 | 1/2009 | Vollmer et al. |
| 2009/0039713 A1 | 2/2009 | Bott et al. |
| 2009/0072634 A1 | 3/2009 | Vollmer |
| 2009/0152959 A1 | 6/2009 | Vollmer |
| 2009/0152976 A1 | 6/2009 | Bott et al. |
| 2009/0160283 A1 | 6/2009 | Bott et al. |
| 2009/0184602 A1 | 7/2009 | Braun et al. |
| 2009/0206686 A1 | 8/2009 | Vollmer |
| 2009/0212644 A1 | 9/2009 | Bott et al. |
| 2009/0218904 A1 | 9/2009 | Vollmer |
| 2009/0251013 A1 | 10/2009 | Vollmer et al. |
| 2009/0295236 A1 | 12/2009 | Bott et al. |
| 2009/0295251 A1 | 12/2009 | Vollmer et al. |
| 2009/0302832 A1 | 12/2009 | Budde et al. |
| 2009/0315424 A1 | 12/2009 | Vollmer |
| 2009/0322174 A1 | 12/2009 | Grossmann et al. |
| 2010/0000830 A1 | 1/2010 | Budde et al. |
| 2010/0013332 A1 | 1/2010 | Vollmer |
| 2010/0013333 A1 | 1/2010 | Vollmer |
| 2010/0013341 A1 | 1/2010 | Vollmer |
| 2010/0052466 A1 | 3/2010 | Vollmer et al. |
| 2010/0133940 A1 | 6/2010 | Grossmann et al. |
| 2010/0259136 A1* | 10/2010 | Hiramoto ............... H02K 1/223 310/68 D |
| 2010/0264770 A1 | 10/2010 | Braun et al. |
| 2011/0006617 A1 | 1/2011 | Budde et al. |
| 2012/0007458 A1* | 1/2012 | Rozinsky ................ H02K 1/02 310/156.47 |
| 2012/0025654 A1 | 2/2012 | Bach et al. |
| 2012/0038228 A1 | 2/2012 | Vollmer |
| 2012/0146435 A1 | 6/2012 | Bott et al. |
| 2013/0127264 A1 | 5/2013 | Fick et al. |
| 2013/0127265 A1 | 5/2013 | Fick et al. |
| 2013/0127267 A1 | 5/2013 | Fick et al. |
| 2013/0147285 A1 | 6/2013 | Vollmer et al. |

FOREIGN PATENT DOCUMENTS

| | | |
|---|---|---|
| CN | 101080862 A | 11/2007 |
| CN | 102208853 A | 10/2011 |
| CN | 102497077 A | 6/2012 |
| DE | 10 2012 200 882 A1 | 7/2013 |
| EP | 2 626 988 A2 | 8/2013 |
| JP | 3510808 B2 | 3/2004 |
| KR | 100709301 B1 | 4/2007 |
| WO | WO 2013103762 A1 | 7/2013 |

* cited by examiner

ROTOR OF A DYNAMOELECTRIC ROTARY MACHINE

CROSS-REFERENCES TO RELATED APPLICATIONS

This application claims the priority of European Patent Application, Serial No. 13180733.1, filed Aug. 16, 2013, pursuant to 35 U.S.C. 119(a)-(d), the disclosure of which is incorporated herein by reference in its entirety as if fully set forth herein.

BACKGROUND OF THE INVENTION

The present invention relates to a rotor of a dynamoelectric rotary machine and the dynamoelectric rotary machine itself, wherein the rotor has directionally different inductances.

The following discussion of related art is provided to assist the reader in understanding the advantages of the invention, and is not to be construed as an admission that this related art is prior art to this invention.

Thus, for example, in previous electrical machine manufacture, reluctance rotors have been constructed using magnetically soft material and combined with air gaps in the rotor laminations in order to obtain directionally different magnetic resistances. Different inductances are therefore produced in a d-axis and a q-axis, thus causing tangential forces on the rotor surfaces.

In the case of permanently excited machines having magnets inside the rotor, air gaps are selectively provided in the rotor's magnetically soft laminations in order to reduce the q-inductances.

Disadvantageously, however, the production costs for such a rotor are comparatively high. The efficiency of dynamoelectric rotary machines of this type is comparatively low.

It would therefore be desirable and advantageous to obviate prior art shortcomings and to create a rotor, in particular a reluctance rotor, of simple construction which has the same electrical and dynamic characteristics as permanently excited synchronous motors.

SUMMARY OF THE INVENTION

According to one aspect of the present invention, a reluctance rotor of a dynamoelectric rotary machine has an even number of poles, wherein the pole material of the reluctance rotor exhibits structural magnetic anisotropy, having in one spatial direction a comparatively low magnetic resistance, a magnetic permeability of $\mu r > 20$ and a saturation polarization of $>1T$ and, in the other two spatial directions perpendicular thereto, a comparatively high magnetic resistance with a magnetic permeability of $\mu r < 1.6$.

According to another aspect of the present invention, a permanently excited rotor by means of essentially radially disposed ferrite magnets which are separated from one another by a material exhibiting structural magnetic anisotropy, having in one spatial direction a comparatively low magnetic resistance, a magnetic permeability of $\mu r > 20$ and a saturation polarization of $>1T$ and, in the other two spatial directions perpendicular thereto, a comparatively high magnetic resistance with a magnetic permeability of $\mu r < 1.6$.

According to another aspect of the present invention, a dynamoelectric rotary machine has a rotor of the aforedescribed type and a stator with a system of windings generating a magnetic field that interacts electromagnetically with the rotor during the operation of the dynamoelectric rotary machine.

The materials of the reluctance rotor exhibit structural magnetic anisotropy. In one spatial direction, the material has a low magnetic resistance $\mu r > 20$ and a saturation polarization of $B > 1T$. In the two other spatial directions perpendicular thereto, the material behaves similarly to air and has a $\mu r < 1.6$. In these two other spatial directions, the magnetic resistance is comparatively high.

This design provides a similar efficiency to that of permanently excited synchronous machines. This material having structural magnetic anisotropy is not a case of full-fledged permanent magnets constituting separate excitation of the rotor, rather the structural anisotropy causes the magnetic flux produced by the stator to be guided with low magnetic resistance in one spatial direction—which can also be varied section by section.

The production costs are lower because no full-fledged permanent magnets have to be manufactured, in particular magnetized.

This material exhibiting structural magnetic anisotropy has only a comparatively low coercive field strength.

Advantageously, neodymium-iron-boron having a low coercive field strength $<10$ kA/m is mainly used in the embodiment according to the invention.

The use of these materials with dynamoelectric machines results in new design features. The flux can now be directed, resulting in low leakage and increasing the efficiency of the dynamoelectric machine particularly compared to conventional reluctance machines. Rotor inductances are directionally influenced or rather set as early as the rotor construction phase, so that two-, four-, six-, eight- or multi-pole rotors are produced.

In another embodiment of the invention, the structural magnetic anisotropy reduces the shunt-inductances in permanently excited machines having interior magnets, e.g. ferrite magnets that are arranged radially. This results in a comparatively higher linearity of the current/torque characteristic of the dynamoelectric machine.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
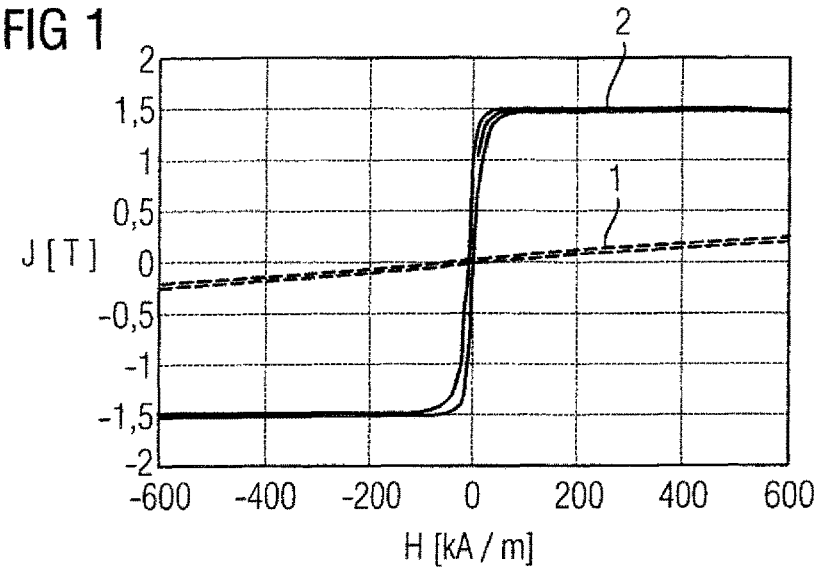
FIG. 1 shows a basic representation of the magnetic properties of the material.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there are shown the magnetic properties of the employed neodymium-iron-boron based material which exhibits structural magnetic anisotropy. The saturation polarization J is here plotted against the magnetic field strength H. "2" denotes the curve with µr>20 and low magnetic resistance. "1" denotes the other spatial directions having a comparatively high magnetic resistance.

Figure 2:
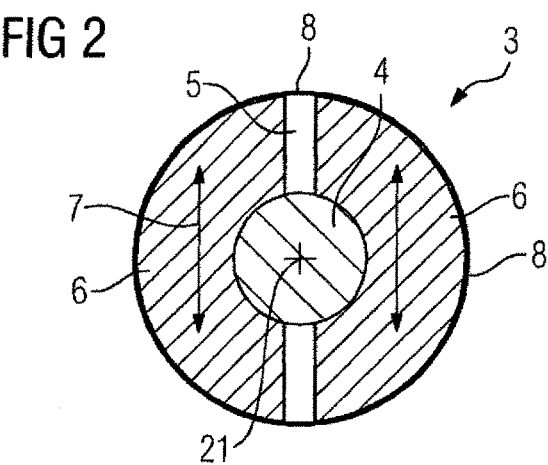
FIG. 2 shows a two-pole reluctance rotor.

FIG. 2 shows a reluctance rotor 3 having two poles 6 separated from one another by a pole gap 5. The low magnetic resistance path is denoted by "7" whereas the direction of arrow corresponds to curve "2" in FIG. 1. The poles 6 are here bonded to a shaft 4 and the pole gap 5. Additionally, or instead, this overall arrangement can also be fixed in the circumferential direction by a banding 8.

Figure 3:
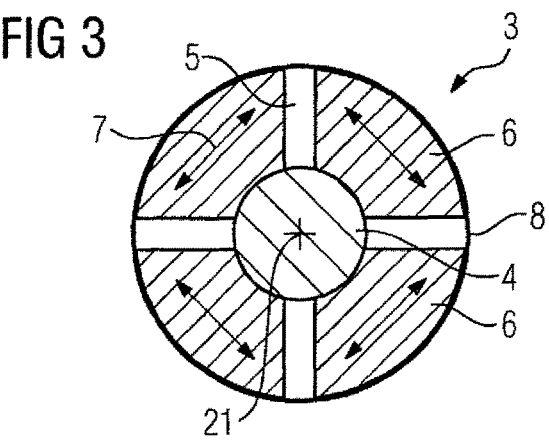
FIG. 3 shows a four-pole reluctance rotor.

FIG. 3 shows a reluctance rotor 3 having four poles 6 separated from one another by pole gaps 5. The low magnetic resistance path is denoted by "7". The poles 6 are here bonded to a shaft 4 and the pole gaps 5. Additionally, or instead, this overall arrangement can also be fixed in the circumferential direction by a banding 8.

The pole gaps 5 of this reluctance rotor 3 are preferably made of non-magnetic material.

Figure 4:
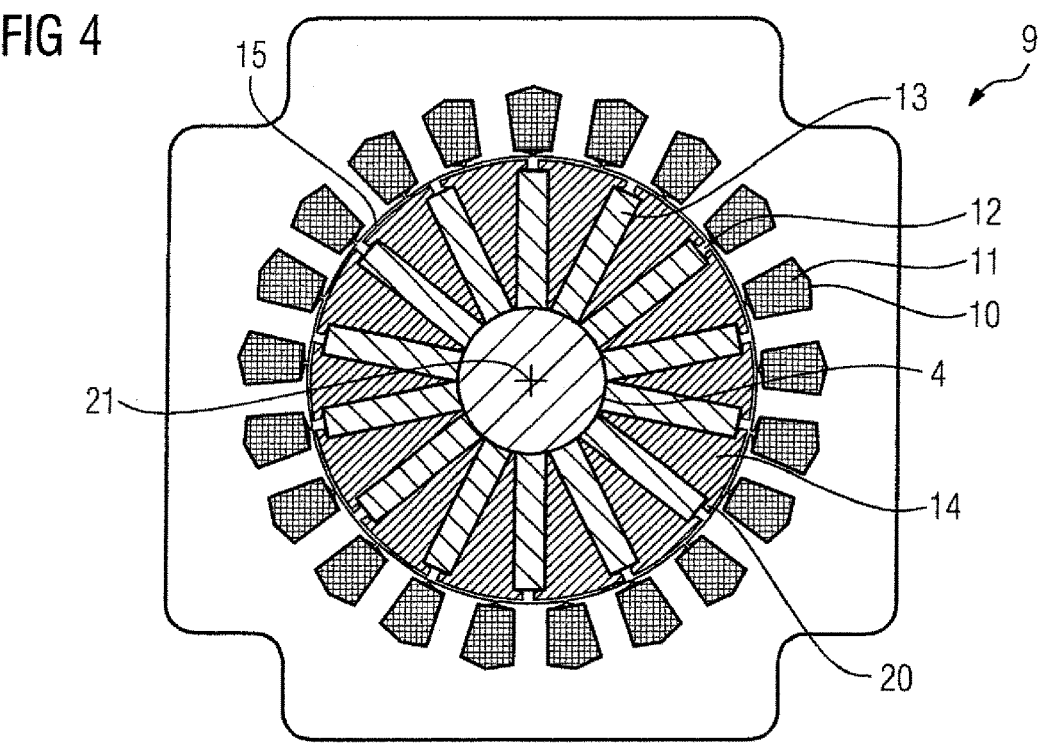
FIG. 4 shows a stator and a rotor of a permanently excited machine having interior magnets.

FIG. 4 shows a cross-section through a dynamoelectric rotary machine 9 having a stator and a system of windings 11 disposed in grooves 10 of the stator. The grooves 10 point toward an air gap 15 of the dynamoelectric rotary machine 9. The rotor of this machine 9 has radially disposed ferrite magnets 13 whose field lines run tangentially within the ferrite magnets 13 (see FIG. 6). Viewed in the circumferential direction, the ferrite magnets 13 are separated from one another by segments 14. In this embodiment, the segments 14 are disposed in the circumferential direction between the ferrite magnets 13 and retain the latter by at least partially tangentially covering or rather engaging around the ferrite magnets 13 in the region of the air gap 15. The covers 20 are also suitable for flux guidance in the region of the air gap 15. The segments 14 are made of the structurally anisotropic material in order to assist, by means of the structural magnetic anisotropy, the magnetic excitation of the rotor produced by the ferrite magnets 13.

Figure 5:
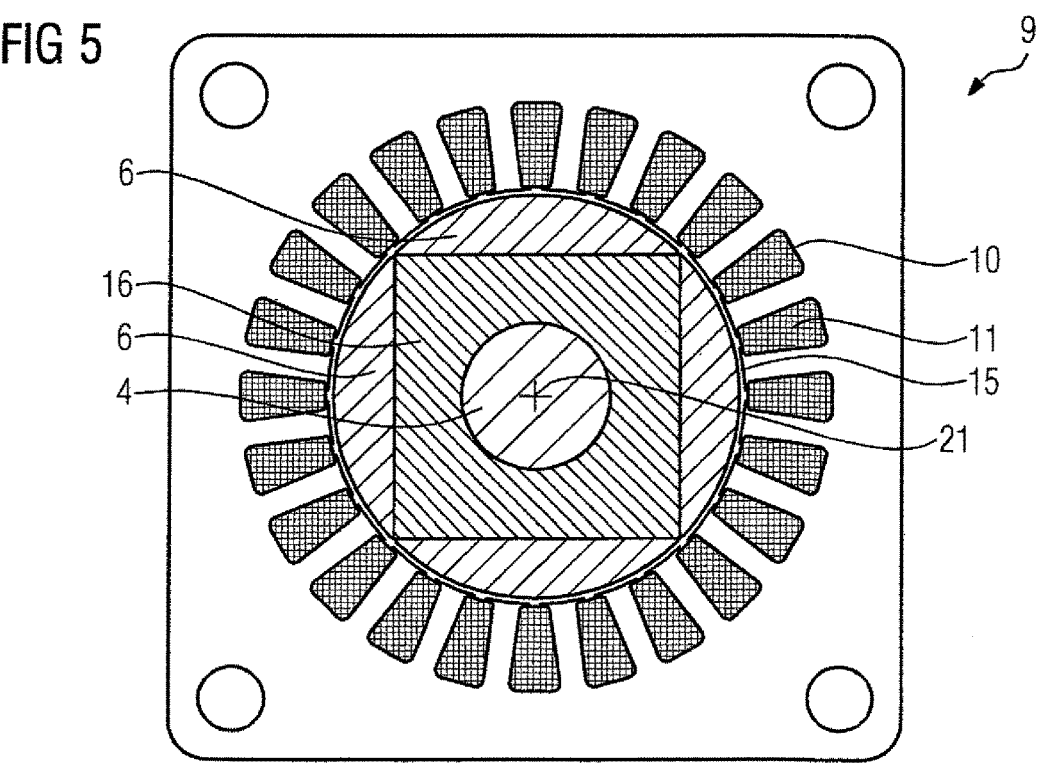
FIG. 5 shows a reluctance machine in cross-section.

FIG. 5 shows another dynamoelectric machine 9 having a reluctance rotor comprising four poles 6 which are present as exterior segments. Between the energized windings 11 of the stator and the reluctance rotor 3, electromagnetic interactions occur which cause the reluctance motor to turn, producing a torque. The electromagnetic interaction is preferably determined by the sections of the poles 6 facing the air gap 15. In this embodiment, the shaft 4 is therefore surrounded by a stainless-steel sleeve 16 to which the poles 6 are fixed. The poles 6 of structurally anisotropic material are positioned on said stainless-steel sleeve by an interference fit or by bonding—e.g. adhesively—to the stainless-steel sleeve 16.

The poles 6 can similarly be positioned on or adjacent to a hollow shaft in which, for example, gearing units or control elements of a motor are at least partly disposed.

The poles 6 of structurally anisotropic material are each implemented in one piece. In another embodiment, the poles 6 each consist of a plurality of sections. The boundary planes of the adjacent sections of a pole 6 are disposed axially parallel or perpendicular to the axis.

Figure 6:
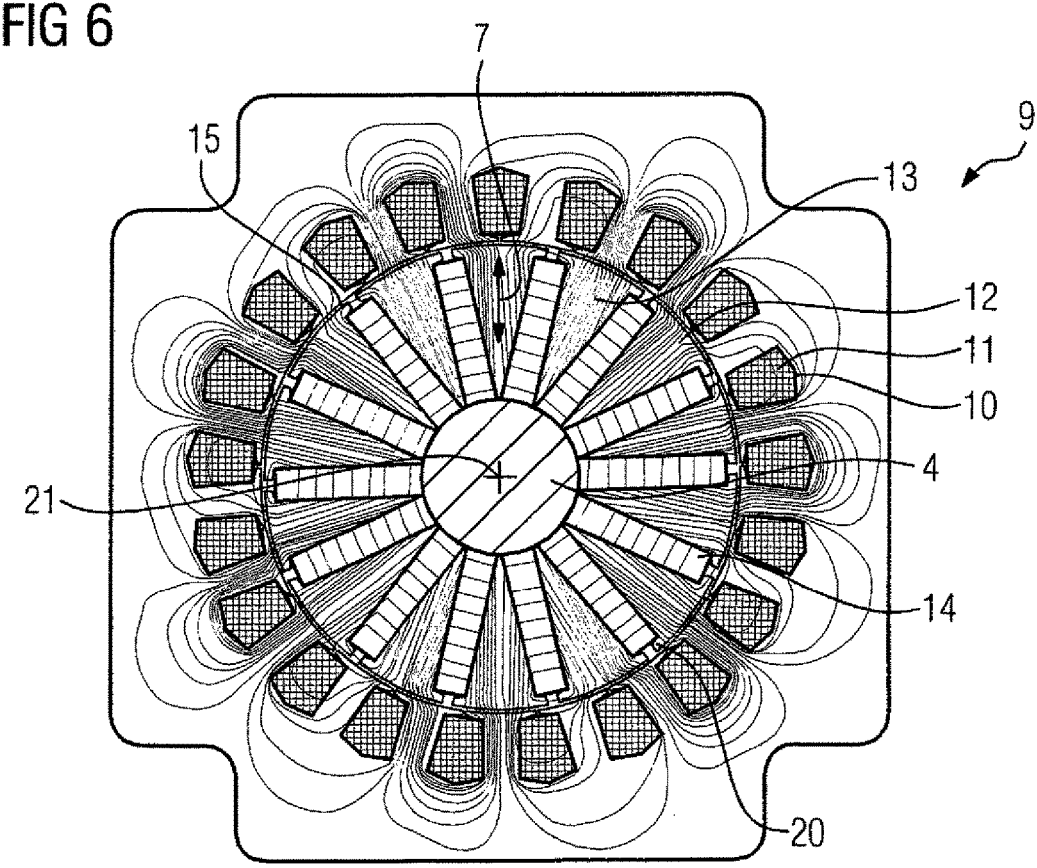
FIG. 6 shows a stator and a rotor of a permanently excited machine having interior magnets with basically represented field pattern.

FIG. 6 shows a dynamoelectric rotary machine 9 according to FIG. 4, wherein a basic field line pattern in the stator lamination, the rotor segments 14 and the ferrite magnets 13 is illustrated. In the segments 14 between the ferrite magnets 13, because of the provided structural magnetic anisotropy of the material of the segments 14, the field lines run virtually radially and parallel, having the preferred direction denoted by "7", as there the lowest magnetic resistance is present due to the material. The field lines within the ferrite magnets 13 run tangentially. As a result of the optimized field line pattern, a comparatively higher utilization of the dynamoelectric rotary machine 9 is achieved.

In FIG. 6 only the shaft 4 is hatched and the system of windings 11 is graphically distinguished by a checkered pattern. The lines in the stator lamination, the lines in the ferrite magnets 13 and the radial lines in the segments 14 represent magnetic field lines.

Figure 7:
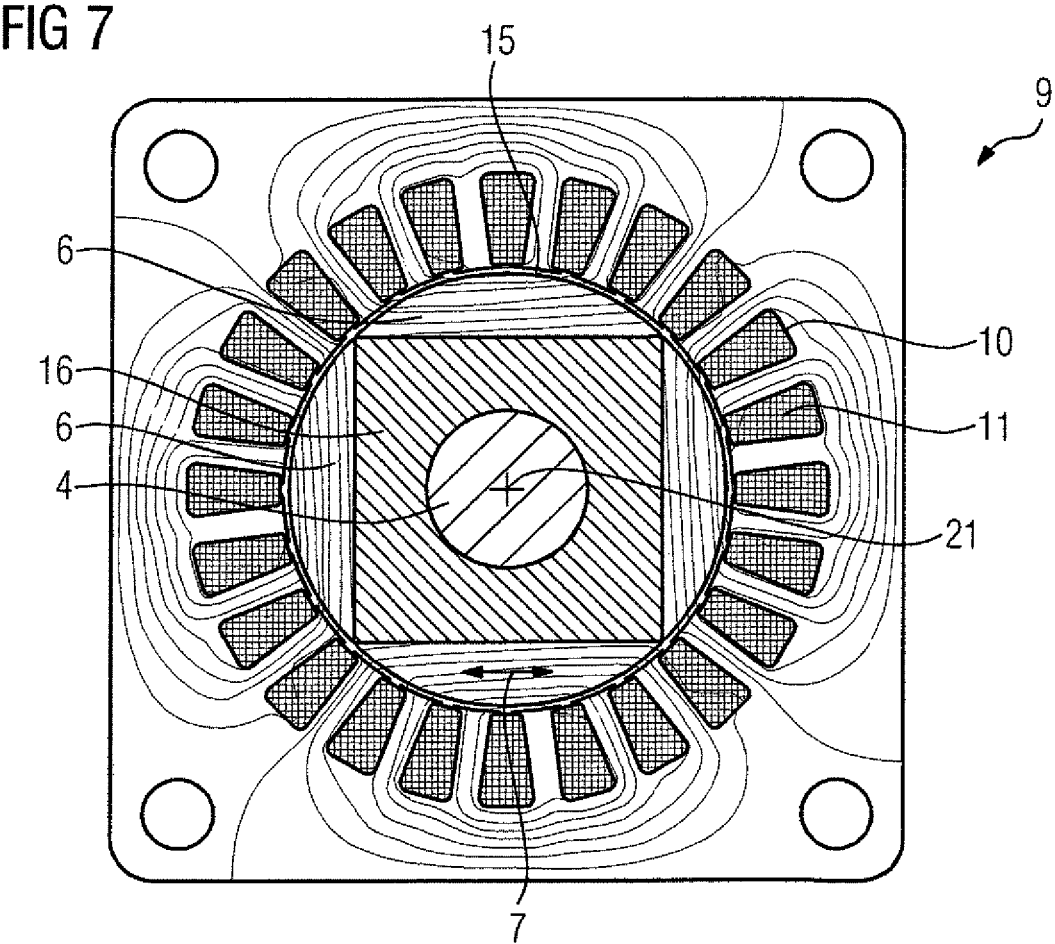
FIG. 7 shows a reluctance machine in cross-section with basically represented field pattern.

FIG. 7 shows a dynamoelectric rotary machine 9 according to FIG. 5, wherein a basic magnetic field line pattern in the stator lamination and in the rotor poles 6 disposed on the stainless-steel sleeve 16 is illustrated. The field lines in the poles 6 run virtually tangentially to the axis 21 or rather, in this embodiment, parallel to the respective edge of the stainless-steel sleeve 16 on which the poles 6 are disposed.

In FIG. 7 only the shaft 4 and the stainless-steel sleeve 16 is hatched and the system of windings 11 is graphically distinguished by a checkered pattern. The lines in the stator lamination and the lines in the poles 6 having their preferred direction "7" represent magnetic field lines.

Because of their utilization or rather their operating characteristics, dynamoelectric rotary machines 9 incorporating the above described rotors behave like permanently excited synchronous machines having rare-earth magnets.

Such dynamoelectric rotary machines 9 incorporating the above described rotors are suitable for machine tool drives and for drives in automotive applications such as rail vehicles, E-bikes and E-cars.

While the invention has been illustrated and described in connection with currently preferred embodiments shown and described in detail, it is not intended to be limited to the details shown since various modifications and structural changes may be made without departing in any way from the spirit and scope of, the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A reluctance rotor of a dynamoelectric rotary machine having an even number of poles constructed of a material having structural magnetic anisotropy, wherein the magnetic anisotropy of the material comprising a first magnetic resistance in a first spatial direction and a second magnetic resistance in spatial directions perpendicular to the first spatial direction, wherein the second magnetic resistance is greater than the first magnetic resistance, the material having a magnetic permeability of µr>20 and a saturation polarization of >1T in the first spatial direction, and a magnetic permeability of µr<1.6 in the spatial directions perpendicular to the first spatial direction.

2. The reluctance rotor of claim 1, wherein the material of the poles is a ferromagnetic material having a coercive field strength H<10 kA/m.

3. The reluctance rotor of claim 2, wherein the material of the poles is based on a mixture on neodymium, iron and boron.

4. A permanently excited rotor comprising substantially radially disposed ferrite magnets which are separated from one another by a material exhibiting structural magnetic anisotropy, wherein the magnetic anisotropy of the material comprising a first magnetic resistance in a first spatial direction and a second magnetic resistance in spatial directions perpendicular to the first spatial direction, wherein the second magnetic resistance is greater than the first magnetic resistance, the material having a magnetic permeability of $\mu r>20$ and a saturation polarization of >1T in the first spatial direction, and a magnetic permeability of $\mu r<1.6$ in the spatial directions perpendicular to the first spatial direction.

5. A dynamoelectric rotary machine comprising:
a permanently excited rotor comprising substantially radially disposed ferrite magnets which are separated from one another by a material exhibiting structural magnetic anisotropy, wherein the magnetic anisotropy of the material comprising a first magnetic resistance in a first spatial direction and a second magnetic resistance in spatial directions perpendicular to the first spatial direction, wherein the second magnetic resistance is greater than the first magnetic resistance, the material having a magnetic permeability of $\mu r>20$ and a saturation polarization of >1T in the first spatial direction, and a magnetic permeability of $\mu r<1.6$ in the spatial directions perpendicular to the first spatial direction, and
a stator having a system of windings generating a magnetic field which, during operation of the dynamoelectric rotary machine, interacts electromagnetically with the rotor.

6. A drive for machine tools and in automotive engineering, the drive comprising:
a permanently excited rotor comprising substantially radially disposed ferrite magnets which are separated from one another by a material exhibiting structural magnetic anisotropy, wherein the magnetic anisotropy of the material comprising a first magnetic resistance in a first spatial direction and a second magnetic resistance in spatial directions perpendicular to the first spatial direction, wherein the second magnetic resistance is greater than the first magnetic resistance, the material having a magnetic permeability of $\mu r>20$ and a saturation polarization of >1T in the first spatial direction, and a magnetic permeability of $\mu r<1.6$ in the spatial directions perpendicular to the first spatial direction, and
a stator having a system of windings generating a magnetic field which, during operation of the dynamoelectric rotary machine, interacts electromagnetically with the rotor.

* * * * *